July 6, 1926. 1,591,188
H. SHERIZEN
BUMPER
Filed April 9, 1924 2 Sheets-Sheet 2
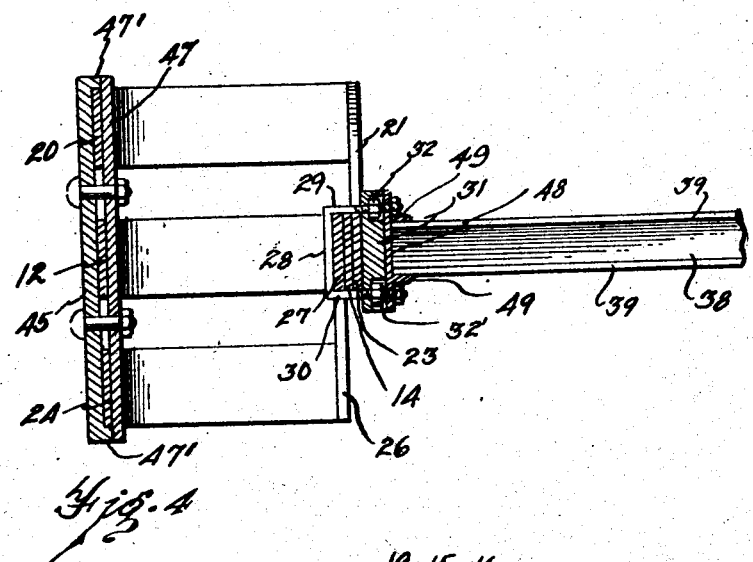
Fig. 4
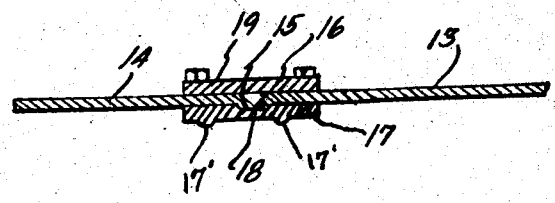 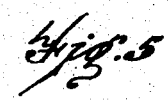
Fig. 5
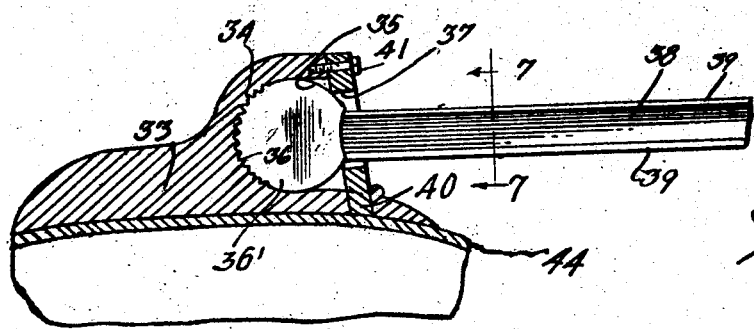 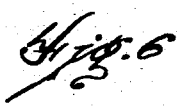
Fig. 6
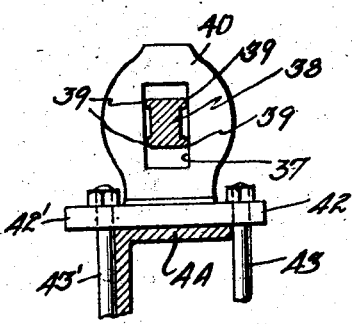
Fig. 7
INVENTOR.
Herman Sherizen
BY
ATTORNEY Patented July 6, 1926.

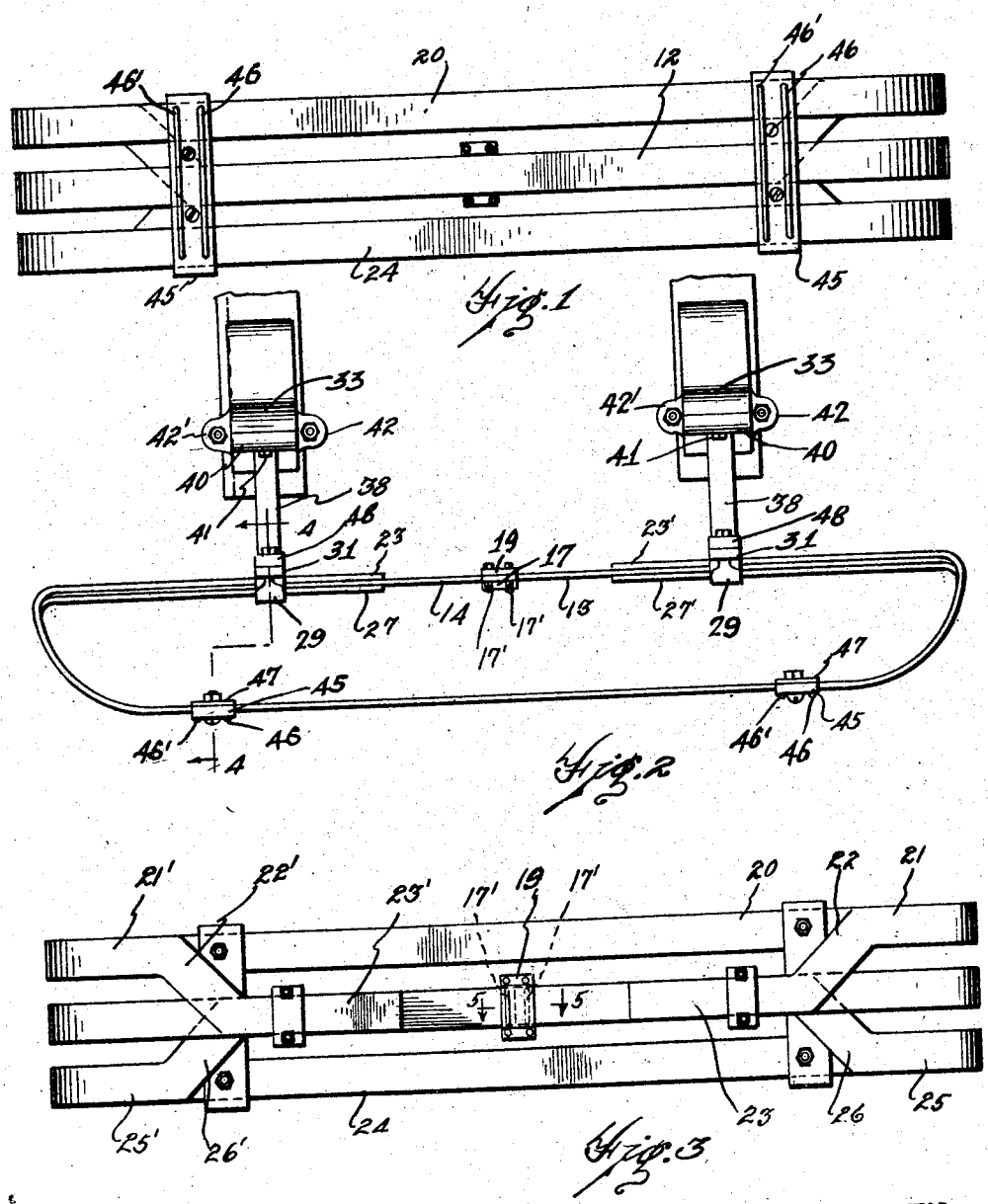

1,591,188

UNITED STATES PATENT OFFICE.

HERMAN SHERIZEN, OF DETROIT, MICHIGAN.

BUMPER.

Application filed April 9, 1924. Serial No. 705,208.

My invention relates to a new and useful improvement in a bumper, and has for its object the provision of a bumper which will be simple in structure, economical of manufacture and highly efficient in use.

Another object of the invention is the provision of a bumper, having a plurality of contact bars, doubled upon themselves, held in spaced relation, and so arranged and formed as to overlap to permit the binding of the same together at the rear of the bumper.

Another object of the invention is the provision in conjunction with a bumper of a bracket for supporting the same, adapted for various degrees of adjustment for regulating the relative height of the bumper to the chassis of the vehicle with which used.

Another object of the invention is the provision of a bumper, presenting a maximum width for a contact surface and at the same time, reducing the weight of the bumper to a minimum.

Other objects will appear hereinafter.

The invention consists in the combinations and arrangements of parts hereinafter described and claimed.

The invention will be best understood from a reference to the accompanying drawings which form a part of this specification and in which, Fig. 1 is a front elevational view of the invention, Fig. 2 is a top plan view of the invention, Fig. 3 is a rear elevational view of the invention, Fig. 4 is a sectional view taken on substantially line 4—4 of Fig. 2, Fig. 5 is a sectional view taken on substantially line 5—5 of Fig. 3, Fig. 6 is a central vertical longitudinal sectional view of the bracket for supporting the bumper, Fig. 7 is a sectional view taken on substantially line 7—7 of Fig. 6.

The invention, in its preferred form, as shown in the drawings, comprises a bumper made up of a plurality of bars, held in spaced relation to each other, the central bar 12 being doubled upon itself to form the rear inwardly extending ends 13 and 14, the extreme ends 16 and 15 respectively of these members being angularly turned and adapted for engaging the beveled edges of a recess 18 formed in a connecting block 17, which is held in position by bolts projected therethrough and through a co-operating block 19 positioned on the opposite side of the ends 13 and 14, to bind the same in assembled relation and to prevent a withdrawal of these ends from each other, as is clearly shown in Fig. 5. Associated with the central bar 12 is an upper spaced bar 20, having the end portion 21 doubled upon itself to lie in registration with the main body of the member 20 and provided with an angularly turned portion 22, which terminates in a further angularly turned portion 23, adapted to lie in registration with the end 14, when in assembled relation. The opposite end of the member 20 is similarly provided with a doubled over portion 21', an angularly turned portion 22' and a further angularly turned portion 23'. The lower bar 24 of the bumper is in spaced relation to the central bar 12 and is provided, at its end, with a doubled-over portion 25, adapted to lie in registration with its main body and provided with an upwarly angularly turned portion 26, and a further angularly turned portion 27, adapted to lie, when in assembled relation, in registration with the portion 23 and the end 14. The opposite end of the bar 24 is also provided with a doubled over portion 25', an angularly turned portion 26' and a further angularly turned portion 27'. A clamp is provided for binding the portions 23, 27 and 14 in assembled relation and another clamp for binding the portions 23', 27' and 13 in assembled relation. These clamps 28 are U-shaped and provided with threaded legs 29 and 30 which embrace the portions clamped and are adapted to project through openings formed in a co-operating plate 31, having recesses formed therein for the reception of nuts 32 and 32' threaded respectively upon the legs 29 and 30. The nuts, when threaded into the recesses provided for them, are adapted to lie flush with the outer surface of the plate 31.

The bracket which is adapted for supporting the bumper comprises a head 33, having laterally extending lugs 42 and 42' on opposite sides thereof, adapted for the reception of the legs 43 and 43' of a U-shaped clamping member which embraces the chassis 44 of the vehicle with which used, suitable nuts being threaded on the legs 43 and 43' for maintaining the bracket head 33 in its assembled or operative position.

Formed in the head 33 is a slit 35, provided, at its rear end, with a semi-circular surface, having teeth 34 formed therein. These teeth are adapted to mesh with teeth 36 on a circular disk 36' which is fixedly mounted on a supporting arm 38, projected through a slot 37, formed in a closure 40. The supporting arm 38 is provided, at its four corners, with reinforcing ribs 39. The closure 40 is secured to the head 33 by a suitable screw, or bolt, 41 threaded into a threaded socket formed in the head. As shown in Fig. 5 and Fig. 3, the plate 17 is provided with reinforcing ribs, or moulding, 17'.

As shown in Fig. 1, the bars are held in spaced relation at the forward end thereof by bars 45 having reinforcing ribs 46 and 46' extending longitudinally thereof. The bar 45 is secured to a clamping bar 47, adapted for engaging the rear side of the bars, suitable bolts being projected between the bars for binding these clamping members in assembled relation. As shown in Fig. 4, each of the bars 45 is provided, at its end, with angularly turned portions 47', adapted to engage the outer edges of the upper and lower bars 20 and 24. A cap 48, which is formed cup-shaped to provide the flanges 49, which embrace the arm 38, is mounted on the arm 38 by means of a bolt projected therethrough and threaded into the arm 38. The head of this bolt is countersunk to provide a smooth surface on the outer portion of the cap 48. The cap 48 is, as is shown in Fig. 4, provided with outwardly extending lugs through which the legs 29 and 30 project. Suitable nuts are threaded upon these legs to bind the cap and the arm in assembled relation with legs 29 and 30. In mounting the arm 38 in the bracket, the closure 40 is removed therefrom and the disk and arm projected through the opening 37 formed in the closure. The disk 36' is then inserted into the slit 35 so that the teeth, on its periphery, will mesh with the teeth 34 formed in the head 33. The angle of elevation of the arm 38 is determined by the teeth which are brought into mesh. With a bumper constructed as described, there is provided a rigid and compact structure, capable of resisting thrusts of great strain and one which is cheaply and easily manufactured and assembled.

With the mounting of the bumper as shown, there is provided a means for quickly and easily determining or changing the elevation of the bumper relatively to the chassis of the vehicle, while, at the same time, there is afforded a simple and easily mounted structure for retaining the bumper in operative position.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. A bumper, comprising a plurality of bars, operatively positioned in spaced relation to each other, the central bar thereof being doubled upon itself and having the ends slightly separated, the extreme ends of said ends being angularly turned; a clamping member for engaging said ends for retaining the same in their relative positions, said clamping member having a recess formed therein, providing edges for the engagement of said angularly turned portions of said ends and each of the remainder of said bars having a doubled over portion lying in alignment with the main body portion and provided with an angularly turned portion terminating in a further angularly turned portion, lying in alignment with and adapted for clamping against one of the doubled over ends of said central bar.

2. A bumper, comprising a plurality of bars, operatively positioned in spaced relation to each other, the central bar thereof being doubled upon itself and having the ends slightly separated, the extreme ends of said ends being angularly turned; a clamping member for engaging said ends for retaining the same in their relative positions, said clamping member having a recess formed therein, providing edges for the engagement of said angularly turned portions of said ends and each of the remainder of said bars having a doubled over portion lying in alignment with the main body portion and provided with an angularly turned portion terminating in a further angularly turned portion, lying in alignment with and adapted for clamping against one of the doubled over ends of said central bar; and means for clamping said aligned angularly turned portions to said doubled-over ends.

3. A bumper comprising a plurality of contact members in spaced relation, one of said members being doubled upon itself and having the ends thereof held in operative position, in spaced relation to the main body thereof; the remainder of said bars each having, at opposite ends, a doubled-over portion, an angularly turned portion and a portion adapted for alignment with the ends of said first mentioned member.

4. A bumper comprising a plurality of contact members, one of said members being doubled upon itself in spaced relation; a plurality of contact members associated therewith, and having their ends doubled upon themselves and angularly turned to bring the ends in alignment with said first mentioned member, affording a parallel extension of the main body with the main body of said member.

5. A bumper comprising a plurality of contact members, one of said members being doubled upon itself in spaced relation; a plurality of contact members associated therewith, and having their ends doubled upon themselves and angularly turned to bring the ends in alignment with said first mentioned member, affording a parallel extension of the main body with the main body of said member, and lying in the same plane therewith.

6. A bumper comprising a plurality of contact members operatively positioned in spaced relation, one of said members being doubled upon itself, the ends thereof being slightly spaced apart, the other of said members being doubled upon themselves and angularly turned to provide portions in alignment with the main body of said first mentioned member, said aligning portions terminating intermediate the center and the end of the main body of said member first mentioned.

7. In a bumper comprising a plurality of contact members adapted for lying in engagement with each other; a bracket for binding said contact members in assembled relation comprising a U-shaped member adapted for embracing the same; a binding block associated with said U-shaped member and provided with recesses for receiving binding nuts, said recesses being of sufficient depth to permit the entry of said nuts therein sufficient distance to permit the outer faces thereof to lie flush with the outer face of said binding block.

8. A bumper bracket comprising a bracket head having a slit formed therein; a supporting arm; a circular member carried by said supporting arm and provided with teeth on the periphery; teeth mounted in said head adapted for meshing with the peripheral teeth mentioned, upon the insertion of said circular member into said slit; a cap mounted on said arm; laterally extending lugs on said cap for the reception of binding means for supporting a bumper thereto.

9. In combination, a bracket of the class described, comprising a head having a slit formed therein; a supporting arm; a circular member carried by said supporting arm and adapted for insertion in said slit; a bumper having a plurality of contact members; over-lapping clamping means for binding said over-lapping contact members; a cap mounted on said supporting arm and adapted for co-operating with said clamping means for supporting said bumper.

In testimony whereof, I have signed the foregoing specification.

HERMAN SHERIZEN.